United States Patent [19]
Mazzini

[11] 4,290,368
[45] Sep. 22, 1981

[54] MANUAL AND MOTOR ACTUATED RAILWAY CAR DOOR

[75] Inventor: Giulio Mazzini, Florence, Italy

[73] Assignee: WABCO Westinghouse, Turin, Italy

[21] Appl. No.: 887,167

[22] Filed: Mar. 16, 1978

[30] Foreign Application Priority Data

Mar. 21, 1977 [IT] Italy .............................. 67617 A/77

[51] Int. Cl.³ ........................ B60J 5/06; B61D 19/00; E05B 65/20

[52] U.S. Cl. ........................................ 105/341; 16/66; 49/141; 49/362; 105/348; 160/331; 277/53

[58] Field of Search ................. 105/341, 341.5, 329 S, 105/342, 343, 148, 348; 49/27, 29, 30, 324, 360, 118, 215, 218, 362, 141; 246/270; 104/173 S; 16/110, 118, 121, 66; 403/333, 334, 361, 327; 160/331; 277/53

[56] References Cited

U.S. PATENT DOCUMENTS

| | | | |
|---|---|---|---|
| 593,190 | 11/1897 | Bernhardt | 403/327 |
| 822,639 | 6/1906 | Vogel | 105/341 |
| 1,574,197 | 2/1926 | Hynes | 105/341 |
| 1,788,409 | 1/1931 | Rowntree | 105/341 |
| 2,096,043 | 10/1937 | Johnson et al. | 105/341 |
| 2,404,845 | 7/1946 | Joachim | 16/110 R |
| 3,371,947 | 3/1968 | Gridley | 49/280 |
| 3,587,477 | 6/1971 | Ferris | 49/410 |
| 3,782,034 | 1/1974 | Lynn et al. | 105/341 |

FOREIGN PATENT DOCUMENTS

| | | | |
|---|---|---|---|
| 1178748 | 1/1967 | United Kingdom | 49/411 |

*Primary Examiner*—David M. Mitchell
*Assistant Examiner*—Howard Beltran
*Attorney, Agent, or Firm*—R. S. Visk

[57] ABSTRACT

A sliding door for railroad cars which may be manually operable but is also provided with a pneumatic device and a pneumatic control circuit operably connected to the door for closing the door by power operation, which pneumatic device, after effecting power closing of the door, is automatically vented of all pneumatic pressure and operably disconnected from the door so as not to offer any resistance during manual operation, and, in particular, during an opening phase of the door by manual operation subsequently to a pneumatic closing phase of the same door.

6 Claims, 9 Drawing Figures

FIG. 4
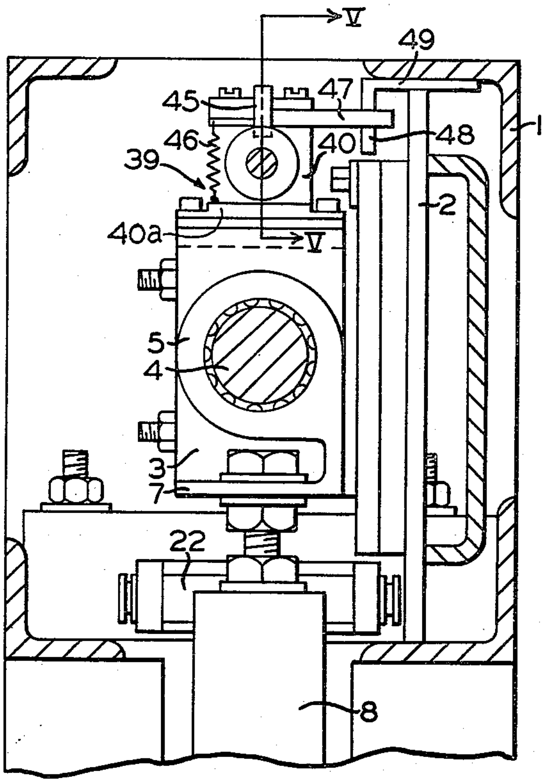
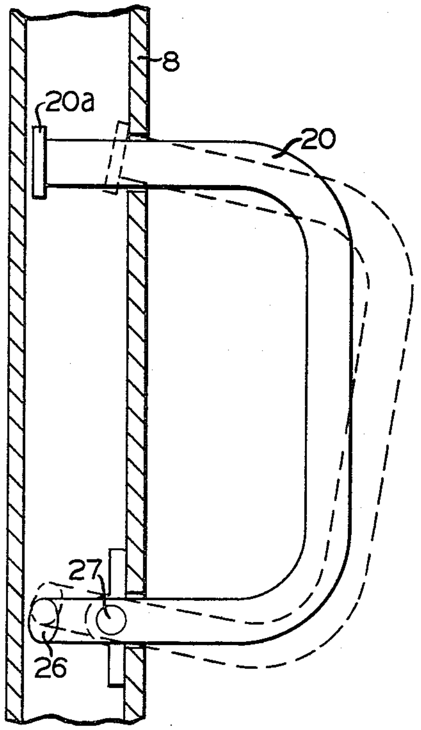
FIG. 7
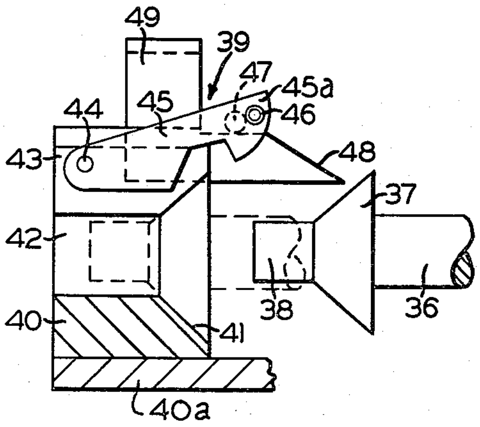
FIG. 5

MANUAL AND MOTOR ACTUATED RAILWAY CAR DOOR

BACKGROUND OF THE INVENTION

Although manually operable sliding doors for railroad cars, including remotely controlled power means for closing the doors, are presently known, these known doors do not necessarily provide for unlocking the power means from the doors after the doors have been closed, so that upon subsequent manual operation of the doors, the operator must also overcome the resistance of the power means when opening the doors manually.

SUMMARY OF THE INVENTION

The primary object of the invention is to devise a manually operable sliding door for railroad cars supported and guided, relative to the fixed structure of the railroad car, and provided with pneumatic means for closing the doors by remote control, said pneumatic means being such as to provide extremely little resistance to manual displacement of the car doors and, hence, afford great ease of handling.

Briefly the invention comprises a sliding door for railroad cars that can be operated manually and is provided with a pneumatic device for remote control closing including a dual-purpose pneumatic cylinder arranged longitudinally parallel to movement of the door and having a piston rod engageable and disengageable with the door, said rod having a free end provided with a catch element engageable with catch elements carried by the door, both cooperating with each other through engaging means carried by the rod to carry out the power closing phase of the door controlled by an electropneumatic control circuit and characterized by the following cycle of operation:

(a) reciprocal engagements of the complementary catch elements of the rod and the door after the rod has travelled a brief initial distance out of the cylinder, (b) the drawing of the door by the rod from the open position to its position of complete closure, (c) disengagement of the engaging means from the catch element of the door in a brief final segment of the path of the rod as it leaves the cylinder, (d) return of the rod to the initial position in which it has completely reentered the cylinder while the door remains in the closed position, disengaged from the pneumatic control system.

Due to the above characteristic, at the end of the pneumatic-control closing cycle, the door can be opened manually without the need to overcome in the resisting forces associated with the displacement of the piston in the pneumatic control cylinder.

According to another characteristic of the invention, timing means are provided, which intervene in the electropneumatic control circuit in the event the closure of the door is not verified within a prescribed time from the beginning of the power closing cycle to cause the rod to return to its initial position in the cylinder while drawing the door into the open position, and additional engaging means are provided, which disengage the catch element of the rod from the catch element of the door during a brief final distance which the rod travels to enter the cylinder, so that the door remains in the open position, disengaged from the pneumatic control system.

BRIEF DESCRIPTION OF THE DRAWINGS

FIG. 4 is a cross section along line IV—IV of FIG. 1;

FIG. 5 is a cross section along line V—V of FIG. 4;

FIG. 6 is a perspective schematic view illustrating the manual control devices of the door in a blocking device;

FIG. 7 is a blow-up of a detail in FIG. 6, showing the control handle situated on the inside of the door;

DESCRIPTION AND OPERATION

Figure 1:
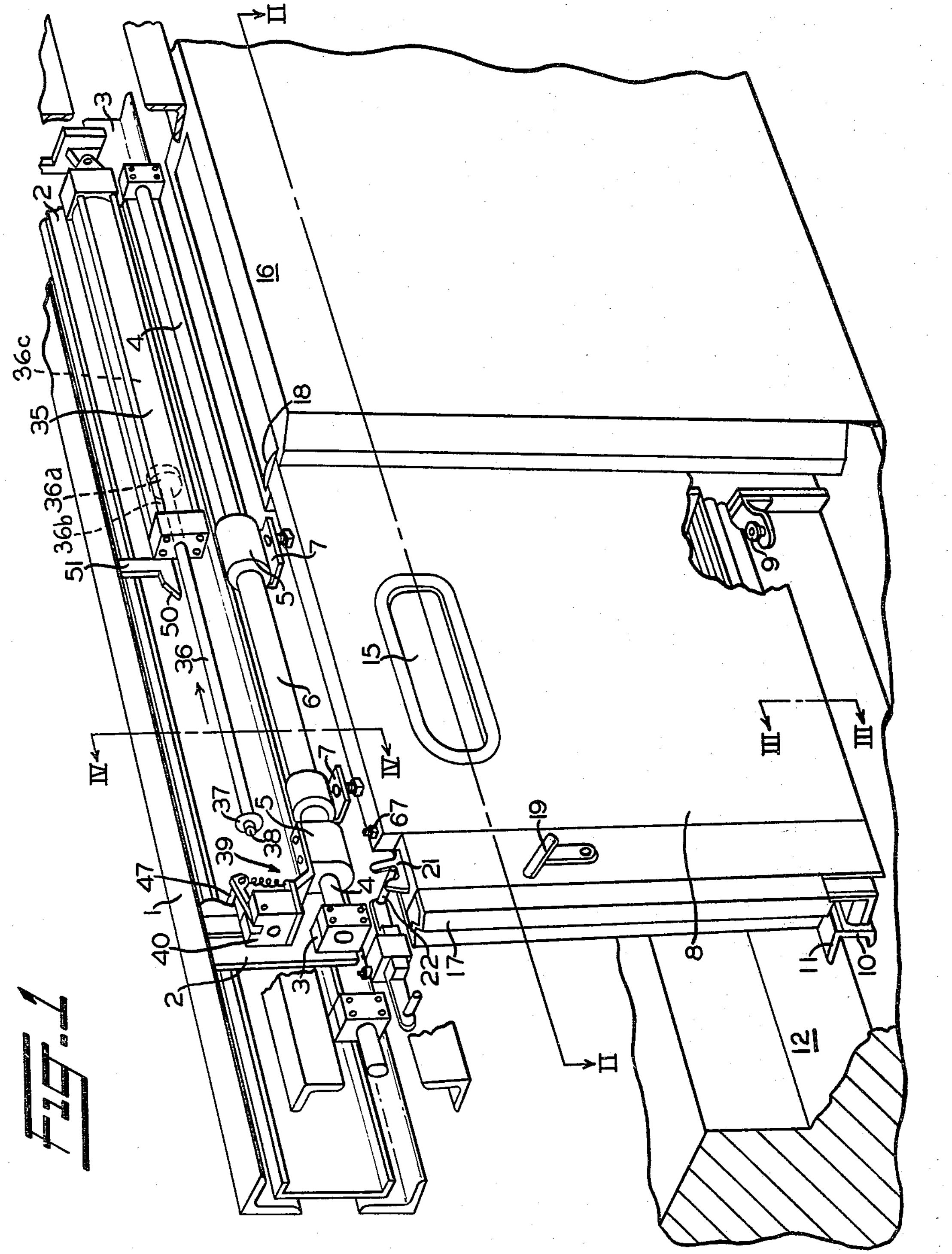
FIG. 1 is a partial perspective view of a central railroad car door embodying the invention.

Numeral 1 denotes a fixed support structure consisting of sectional pieces extending in a longitudinal direction relative to a railroad car.

The numeral 2 indicates two spaced-apart support plates vertically secured on the above-mentioned support structure; the plates 2 support a pair of clamp-type supports 3, in which the respective ends of a cylindrical longitudinal rod 4 are rigidly fixed and have a hardened surface, for example, by cementing.

An assembly consisting of a pair of spaced-apart bearings 5 is mounted in a sliding manner on the rod 4, said bearings being preferably of the ball-bearing type and being connected by a spacer tube 6 surrounding the rod 4 with radial clearance.

A sliding door 8 is suspended from this sliding assembly at two spaced-apart points by two supports 7.

Figure 3:
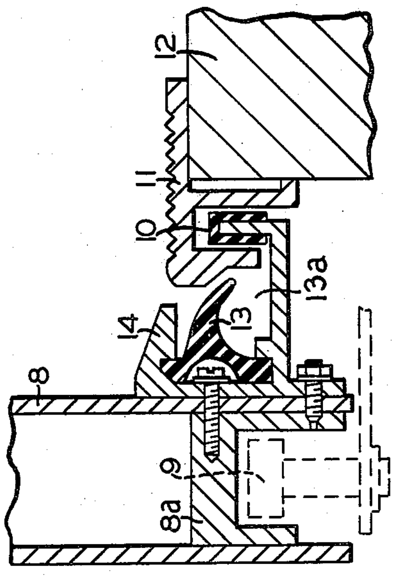
FIG. 3 is a cross section along line III—III of FIG. 1.

As shown in FIG. 3, the door 8, consisting of light-alloy sections, is provided on its lower edge with two guide elements, one consisting of a roller 9 mounted to turn about a vertical axis and carried by a fixed support so as to be rotatably disposed in a longitudinal section piece 8*a* in the form of an inverted channel member secured adjacent the lower edge of the door, and the other guide element comprising a skid 10 in the form of a vertical rib forming a part of a section piece 14 in the form of an inverted channel member fixed to the lower edge of the door, said rib slidably engaging in the inverted channel of a section piece 11 secured to and forming a lining for a step 12 of the car.

The combination of the guiding means described above guarantees perfect vertical positioning of the door even in the case when the door is open or partially open and a passenger leans on the door or uses its edge to help himself out of the car.

A longitudinal sealing member having an arcuately-shaped lip 13 cooperating with the inner surface or edge of the support member 11, is mounted in the support member 14. The retention of air is then guaranteed by a labyrinth 13*a* formed between the members 11 and 14.

The door 8 is provided in its center with a fixed window 15.

Figure 2:
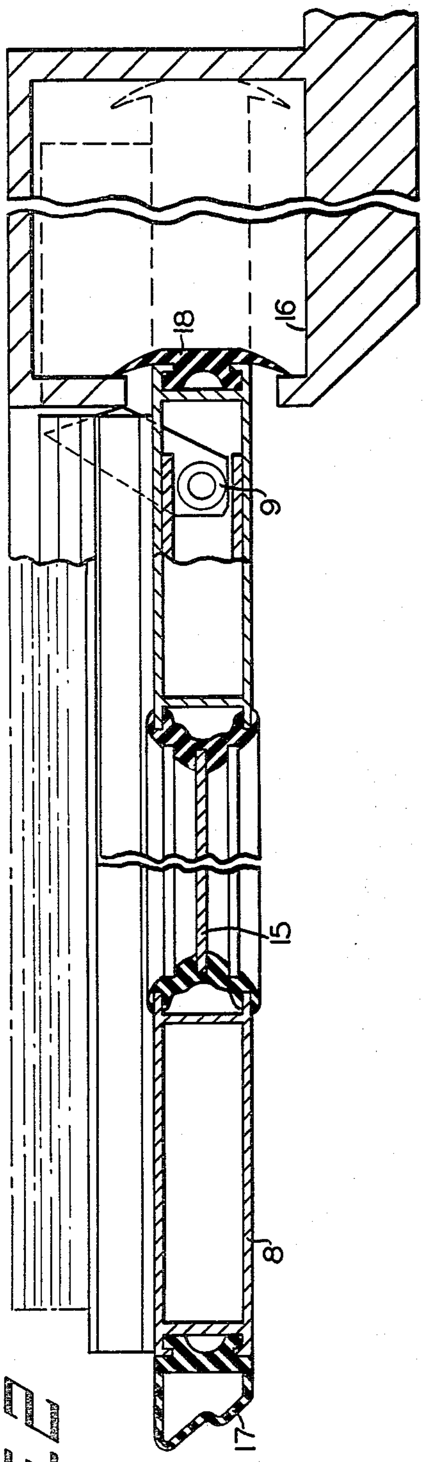
FIG. 2 is a cross section along line II—II of FIG. 1.

As shown in FIG. 2, a housing adapted to receive the door 8 in the open position is denoted by numeral 16 and a sealing member applied to the front or leading edge of the door 8 for making sealing contact with the door frame when the door is closed, is denoted by numeral 17; a cross-sectionally arcuately T-shaped sealing member 18 is disposed on the rear edge of door 8 so as to cooperate with the inner surfaces of the end walls of the housing 16 to make sealing contact therewith when the door is closed.

As shown in FIG. 6, the door 8 is provided with an external rotating handle 19 and in internal handle 20 capable of pivoting in a vertical plane to control locking.

The engaging elements of a lock mechanism consist, in a conventionally known way, of an upper catch element in the form of a rotating fork 21 engaging a pin 22 carried in a transversal direction by the fixed structure 1 and 2, and a lower engaging element not shown in the drawing.

Rotation of the external handle 19 causes a lever 23 with a 90° bend to rotate about a horizontal axis or pin 23*a*, thus causing a rod 24, on which a spring 25 exerts a countertension, to move vertically. Via transmission means not shown here, the rod 24 causes the forked element 21 to pivot out of engagement with pin 22.

The inside handle 20 shown in particular in FIG. 7 is a U-shaped piece lying in a vertical plane and attached in an articulated manner to the door about a horizontal axis 27, corresponding with its lower horizontal arm.

The outward and downward pivoting of the handle 20 causes, by means of an appendage 26 directed longitudinally with the handle itself, the control rod 24 of the lock to rise by engaging with a horizontal appendage 24*a* of said rod.

A vertical rod 28 is attached in an articulated manner to the free end of the appendage 26 of the handle 20.

Figure 8:
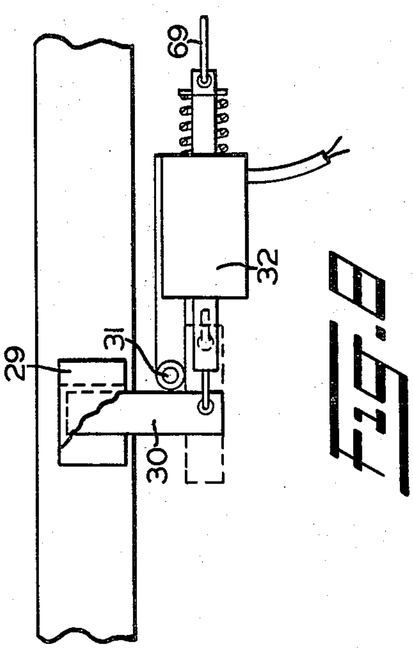
FIG. 8 is a blow-up of a detail from FIG. 6, illustrating the blocking device acting on the control activated by the internal handle.

As shown in FIG. 8, cooperating with the upper end of the rod 28 is an electromagnetic blocking device including a blocking lever 30 articulated around a vertical pin 31 carried by a support stirrup 29. The blocking lever 30 can be made to pivot by an electromagnet 32 commanded by a tachymetric signal.

This blocking device prevents displacement of rod 24 and therefoe disengagement of fork 21 from pin 22 by the inside handle 20 when the railroad car on which the door is mounted exceeds a prescribed velocity. When the velocity of the car reduces to a predetermined lower velocity during the closed phase, the blocking lever 30 pivots outward relative to the position shown in FIG. 6 under the action of the electromagnet 32 so as to free the rod 28 and permit the opening of the door by the inside handle 20. As is obvious in FIG. 6, the aforementioned blocking element does not prevent opening the door by the outside handle 19, even when the blocking device is in the inserted position.

In order to block the outside handle, a mechanical device is provided, as may be seen in FIG. 6, which consists of an eccentric 33 destined to act on the horizontal arm of the lever 23 bent at a 90° angle, which is controllable via an appropriate key inserted in a square hole 34.

Figure 9:
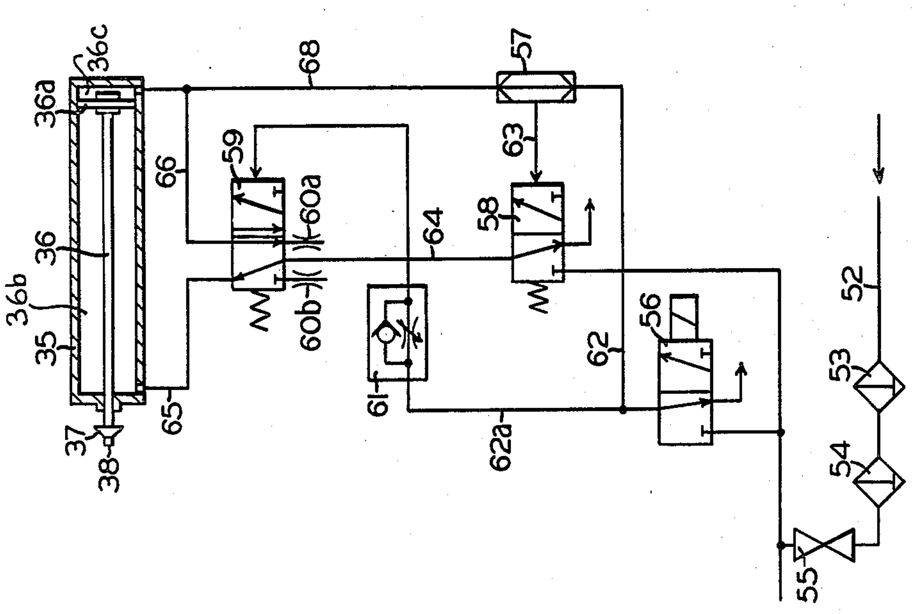
FIG. 9 is a diagram of the electropneumatic control circuit of the car door illustrated in FIG. 1.
Figure 8:
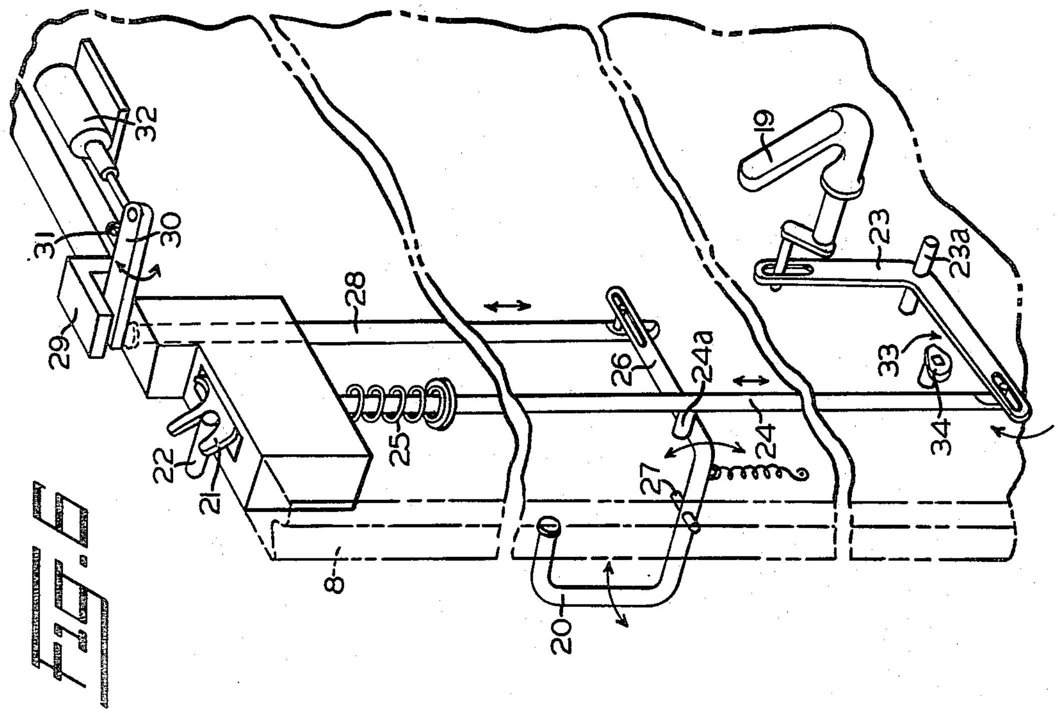

Numeral 35, as best seen in FIG. 9 denotes a pneumatic cylinder fixed on the car body so as to provide power means for controlling the closing of the door 8.

A rod 36, in single-piece construction with a piston 36*a*, is mounted to slide in the cylinder 35. Piston 36*a* divides cylinder 35 into a front chamber 36*b* and a rear chamber 36*c*.

The opposite end of the rod has an enlarged head in the form of a truncated cone 37, from which a cylindrical extension 38 of smaller diameter extends.

As shown in FIG. 5, numeral 39 denotes a catch device cooperative with the catch element 37 of the rod 36, said catch device being fixed on the upper corner of the leading edge adjacent the left-hand end, as viewed in FIG. 1 of the drawings, of the door 8 and being movable therewith.

The catch device 39 includes a body 40 supported by a stirrup 40*a* at one end of the support member 7 with rectilinear bearings 5, on which the door is suspended.

The body 40 has a seat for receiving the catching end of the rod 36; this seat involves a conical part 41 and a central cylindrical hole 42 to receive the head in the form of a truncated cone 37 and the cylindrical extension 38, respectively.

At its upper part, the body 40 has a channel 43, in which a catch lever 45 is mounted in a pivotable manner around a transversal horizontal axis or pin 44 and is provided at its front end with a tooth 45*a* with a curved profile.

The lever 45 is subjected to the action of a spring 46, (see FIG. 4 also) which holds it in an essentially horizontal position when the end of the rod is not engaged in the catch device 39.

Numeral 47 denotes a transversal pin extending from the front end of the catch lever 45.

The pin 47 is adapted to engage, during the last phase of the course of closure of the door, on an inclined surface 48 extending from an angular element 49 fixed to the support structure 1.

During the aforementioned last phase of door closure, the pin 47 slides along the incline surface 48 to cause the lever 45 to pivot upward until the pin 47 is brought to a plane surface so as to maintain the lever 45 stable in the raised position shown in FIG. 5 of the drawing.

Obviously, during the phase of manual door opening, the displacement toward the right in FIG. 5 of the catch device 39 causes the catch lever 45 to return to the horizontal resting position in which it is ready to catch the truncated cone head 37 of the rod 36 during the remote-control pneumatic opening of the door, as will be described in the following.

As illustrated in FIG. 1, the fixed structure 1 has a second inclined plane 50 opposite the inclined plane 48 and supported by a stirrup 51 in position adjacent to the end of the cylinder 35, from which the rod 36 proceeds outwardly.

As will be described in detail in the following, the inclined plane 50 functions to raise the catch lever 45 during the last phase of any opening course of travel of the door under pneumatic control due to an accidental interruption of the closing operation.

In the pneumatic circuit diagram shown in FIG. 9, numeral 52 indicates supply of compressed air in the circuit from the feedline to control the closure of the door by means of the cylinder 35 and the pertinent rod 36.

The equipment comprising this pneumatic circuit includes a filter 53, a lubricator 54, a stopcock 55, a solenoid-operated valve device 56, a double stopvalve 57, a pneumatically-controlled three-way valve 58 with a spring return, a pneumatically-controlled four-way valve 59 with a spring return equipped with discharger feeders 60*a* and 60*b*, and a registration valve 61.

The circuit described above functions as follows:

When at rest, the compressed air of the line stemming from line 52 is present at the inlet of the solenoid-operated valve device 56 and in the inlet of valve 58.

In this state, either valve device 56 or valve 58 cuts off supply of pneumatic pressure from the entire pneumatic apparatus and causes both chambers 36*b* and 36*c* to be connected with the atmosphere.

The pneumatic power control circuit shown in FIG. 9 is actuated by energizing the solenoid of valve device 56 so that compressed air at a pressure of 5 kg/cm$^2$, for example, may flow through a line 62 to the double stopvalve 57 and through a line 62*a* to the registration valve 61.

Valve 57, which is normally in a neutral position, is operated to a first supply position in which it prevents the compressed air from reaching the rear, or right-hand chamber 36*c*, as viewed in FIG. 9, of the cylinder 35 and feeds the valve 58 via a line 63. Activation of the valve 58 from a venting position, in which chamber 36*b* is vented to atmosphere, to a supply position occurs after the compressed air has overcome the counteraction of its return spring, to permit the air to reach the front or left-hand chamber 36*b* of the cylinder 35, as viewed in FIG. 9, through lines 64 and 65, thereby charging said chamber.

This front chamber 36*b* of the cylinder 35 is charged by the action of valve 61, via its own air passage feeder, retards the activation of valve 59, which is counteracted by its own return spring. The purpose of this is to permit the rod 36 to emerge at optimum velocity from the cylinder 35 during the door closing phase.

When the time needed to charge front chamber 36*b* of the cylinder 35 has elapsed, valve 59 is actuated from a first supply position, in whch it is shown, to a second supply position, can also be activated, in which rear chamber 36*c* of the cylinder is charged with compressed air via lines 64 and 66.

In addition, valve 59 establishes communication between the front chamber of the cylinder 35 with the atmosphere via the line 65 and the discharge feeder 60*b*.

After a no-load travel of rod 36 of about 20 mm, in a leftwardly direction for example, the cone 37 of said rod engages the catch device 39 and initiates the closing operation of the door 8 from the open-door position, i.e., when the door is completely within the housing 16.

The complete emergence of the rod 36 from the cylinder 35 causes the door 8 to shift to the closed position shown in FIG. 1 and brings the lock mechanism 39 into the locked engagement position.

During the last short increment of door travel, such as 15 to 20 mm, for example, the pin 47, which is fixed in the catch lever 45, climbs the inclined plane 48 to reach the level surface of the angular element 49, thereby disengaging the catch device 39 from the rod 36 of cylinder 35.

In addition to guaranteeing mechanical retention of the door in the closed position by its engagement with the pin 22, the uppercatch 21 of the lock opens a normally closed microswitch 67 which breaks the electric feed circuit of the solenoids, causing them to be deenergized.

When the solenoid on valve 56 is deenergized, it causes lines 62 and 62*a* to be opened to atmosphere, thereby permitting valve 59 and doublestop valve 57 to return to respective neutral positions. The return of these two valves to neutral positions is assured, in the case of valve 59, by its own return spring and, in the case of the doublestop valve 57, by the pressure existing in the rear chamber 36*c* the cylinder 35 connected to the atmosphere via the discharge feeder 60*a* and by the pressure existing in line 68.

Maintaining the pressure in line 68 permits the doublestop valve 57 to return to its neutral position and, what is more important, maintains valve 58 in the activated state in an operative position. This permits the air to flow through lines 64 and 65 into the front chamber 36*b* of the cylinder 35, thereby permitting the rod 36 to reenter the cylinder completely.

During the reentry phase of rod 36 into cylinder 35 under the control of feeder 60*a*, the pressure in line 68 drops progressively or at a controlled rate and, when this pressure is no longer capable of counteracting the action of the return spring of valve 58, the latter returns to the normal position, intercepting the primary line and also establishing communication between the front chamber 36*b* of the cylinder and the atmosphere via lines 66 and 64.

It is obvious from the above that, at the end of the remote-control pneumatic closing cycle, the door 8 is completely disengaged from the pneumatic control system and is therefore capable of being opened manually with a minimum amount of resistance because both chambers 36*b* and 36*c* are free of air pressure and therefore offer no resistance to manual operation.

In the event that the door does not completely close because of an obstacle (baggage, passenger, etc.) or any factor impeding the sliding of the guide 5, 6 on the rod 4, catch element 37 on rod 36 does not disengage from lever 45, switch 67 remains closed and, consequently, the electric feed circuit of the solenoid remains energized. A time delay during opening would deenergize the solenoids. In this case, the pneumatic cylinder 35 would provide for reopening of the door 8, thereby freeing any passenger who is blocked, because, as rod 36 is retracted into said cylinder, it draws the door with it.

At the end of the above cited reopening phase, the catch device 39 will disengage itself from the rod 36 due to the inclined plane 50, which will raise the catch lever 45 to permit the rod 36 to be disengaged from the catch device, thus permitting the rod itself to reenter the cylinder along a subsequent travel of about 20 mm. The door 8 will therefore be in an open position, i.e., it will have completely reentered the housing 16, and be disengaged from the rod 36 of the pneumatic cylinder, so that it can be reclosed manually under the same conditions of reduced resistance for normal opening manipulation, or pneumatically via rod 36 according to the pneumatic closing cycle described above.

In particular, the pneumatic closing of the door after it has returned accidentally to the open position will occur automatically as a result of the same tachymetric signal that activates the electromagnetic blocking device described above when the car exceeds a prescribed velocity.

Finally, a manual emergency control is provided (not shown in the drawing), which, when activated, either disengages the blocking lever 30 electrically and mechanically (by means of the flexible cable 69 shown in FIG. 8) to permit the lock to be opened by the inside handle, or causes the air accidentally situated in the front chamber of cylinder 35 to be discharged in order to permit and facilitate manual opening of the door.

Naturally, with the principle of the invention remaining the same, the construction details and design forms of the device can be widely varied with regard to the description and illustration here, which are given purely by way of nonlimiting example, without departing from the scope of the present invention.

Having now described the invention, what I claim as new and desire to secure by Letters Patent, is:

1. A sliding door for railroad cars comprising:

(a) a horizontal support member fixed on the car and on which the door is reciprocably slidably operable between open and closed positions;
(b) a pneumatically operable cylinder device including a piston reciprocably operable therein and separating front and rear pressure chambers in the cylinder device;
(c) a piston rod connected to said piston and having a free end extending exteriorly of the cylinder device, said cylinder device being arranged on said support member longitudinally parallel to the direction of travel of the door;
(d) a catch device carried by the door and including a first catch element so positioned as to be engageable by a second catch element carried by the free end of the rod, said catch elements cooperating with each other for effecting power operation of the door by the cylinder device during closing and emergency opening of the door;
(e) an electropneumatic control circuit operable, when energized, for effecting pressurization of the rear pressure chamber of the cylinder device and consequently extension of the piston rod from a retracted position in the cylinder devices to an extended position thereoutof in which said first and second catch elements abuttingly engage, upon a predetermined distance of travel of the rod out of the cylinder device, to effect consequent operation of the door from its said open position toward its said closed position;
(f) first release means operably associated with said catch device and operable for disengaging said first and second catch elements when the door has reached a certain predetermined distance from its closed position;
(g) a lock mechanism carried by the door adjacent the upper leading edge thereof and automatically operable, upon attainment of the closing position of the door, for locking said door in its said closed position until manually released; and
(h) a normally closed electrical switch carried on the door operably connected to said lock mechanism and operable in the closed position of the door to an open position in which the electropneumatic control circuit is deenergized, said control circuit being effective, when deenergized, for venting said rear pressure chamber to atmosphere and pressurizing the front chamber for causing operation of the cylinder device and consequent retraction of the piston rod.

2. Sliding door according to claim 1, further characterized by timing means for inhibiting deenergization of the electropneumatic control circuit, in the event the closing of the door is incomplete within a predetermined time period from the initiation of the closing operation, and thereby causing the rod to return to its initial retracted position within the cylinder prior to disengagement of the catch elements, while drawing the door to its open position, and additional cooperative release means fixedly positioned on said support member as to engage and cause the catch element of the rod to disengage from the catch element of the door when the door has substantially reached its open position and the rod has been substantially retracted into the cylinder, said timing means being operable, after a certain period of time, for deenergizing the electropneumatic control circuit so that the door remains in the open position, disengaged from the electropneumatic control circuit until reenergized by the operator.

3. Sliding door according to claim 1, wherein the catch element carried by the rod consists of an enlarged head in the form of a truncated cone with a cylindrical extension extending axially from its smaller base, and the catch element carried by the door consists of a body supported by the support member on which the door is suspended and has an axial seat abuttingly engageable by the catch element carried by the rod, said body also carrying an upper seat in which a spring-loaded catch lever is articulated about a transversal axis and is engageable with said head in a position corresponding with the larger base due to movement of the rod toward the door, said release means comprising said lever including a transversal appendage making sliding contact with inclined surfaces formed on said catch device for causing disengagement of said first and second catch elements when the door has reached said certain predetermined distance from its said closed position.

4. Sliding door in accordance with claim 1, wherein the door further comprises locking means carried by the door and operable, upon attainment of its closed position, for automatically locking the door in said closed position, and is equipped with an external handle and an internal handle for manually operating the door, and electromagnetically operable blocking means operable responsively to a tachymetric signal, effected upon attainment of the closed position by the door, to a blocking position for inhibiting opening of the locking means by the internal handle only when the car on which the door is mounted exceeds a predetermined velocity, said blocking means being automatically operable to an unlocking position, in which both handles may be operated when the velocity of the car reduces to a velocity below said predetermined velocity.

5. Sliding door in accordance with claim 1, further characterized in that the door is suspended at the top at two points from a sliding assembly, including said support member and a guide rod horizontally fixed thereon, by a pair of bearings slidably arranged on said guide rod for accommodating axial sliding of the door, said door also being provided at its lower end with two guide elements consisting, respectively, of a roller fixed on the car so as to turn about a fixed vertical axis in a longitudinal member in the form of an inverted channel secured on a lower edge of the door and of a skid member in the form of a longitudinal vertical rib that is part of a sectional piece fixed to the bottom edge of the door and engaging in an inverted channel forming a portion of a sectional lining of a car step.

6. Sliding door according to claim 5 characterized by the fact that the sectional piece carrying the rib is provided with a longitudinal sealing member having an arcuate cross section and cooperating with the sectional lining of the step to form a labyrinth traversed by such air contained between said longitudinal member and said vertical rib.

* * * * *